United States Patent [19]
Ban et al.

[11] Patent Number: 5,887,559
[45] Date of Patent: Mar. 30, 1999

[54] HEATING DEVICE FOR VEHICLE

[75] Inventors: Takashi Ban; Shigeru Suzuki; Tatsuya Hirose, all of Kariya, Japan

[73] Assignee: Kabushiki Kaisha Toyoda Jidoshokki Seisakusho, Kariya, Japan

[21] Appl. No.: 914,367

[22] Filed: Aug. 19, 1997

[30] Foreign Application Priority Data

Aug. 23, 1996 [JP] Japan .................................. 8-222487

[51] Int. Cl.⁶ .............................. F02N 17/02; B60H 1/14
[52] U.S. Cl. ..................................... 123/142.5 R; 122/26; 126/247; 237/12.3 B
[58] Field of Search ....................... 123/142.5 R; 122/26; 126/247; 237/12.3 B

[56] References Cited

U.S. PATENT DOCUMENTS 4,424,797  1/1984  Perkins ....................................... 122/26

FOREIGN PATENT DOCUMENTS 2246823  10/1990  Japan .

Primary Examiner—Erick R. Solis
Attorney, Agent, or Firm—Burgess, Ryan & Wayne

[57] ABSTRACT

A viscous heater as an auxiliary heating source in a heating system for a vehicle having a water cooled internal combustion engine. The viscous heater has an inlet port 14 for the engine cooling water and an outlet 15 for the engine cooling water, which are connected to respective conduits in the engine cooling system by means of a coupling device. The coupling device include coupling pipes 50A and 50B which are connected to the respective conduits in the engine cooling system at respective directing angles to allow the coupling pipes 50A and 50B to be aligned with the respective conduits.

9 Claims, 6 Drawing Sheets

5,887,559

HEATING DEVICE FOR VEHICLE

BACKGROUND OF THE INVENTION

1. Field of the Invention

The present invention relates to a heating device for a vehicle wherein an auxiliary heating source is provided for heating recirculating water for heating a cabin of the vehicle.

2. Description of Related Art

The Japanese Unexamined Patent Publication (Kokai) No. 2-246823 discloses a viscous heater which is used as an auxiliary heating source for a heating device for a cabin of a vehicle. The viscous heater includes a front and rear housings which are in axial face-to-face contact and are connected by means of circumferentially spaced bolts which pass through the front and rear housings. Inside the housings, a heat generating chamber and a water jacket are formed so that the water jacket is located outside the heat generating chamber. Formed in the housing are an inlet port for introducing the recirculating water into the water jacket and an outlet port for removing the recirculated water into an outside heating circuit. A rotating shaft is rotatably supported by the front housing via a bearing and a rotor is fixedly connected to the rotating shaft so that the rotor is rotated in the heat generating chamber when the rotating shaft is rotated by a crankshaft of an internal combustion engine. The heat generating chamber is formed with an inner surface, which, at a small distance, faces an outer surface of the rotor. These faced surfaces are formed with labyrinth grooves, which are adjacent to each other. A viscous fluid is filled in the gap between the inner surface of the heat generating chamber and an outer surface of the rotor.

In the operation of the viscous heater in the above patent, an application of a rotating movement to the drive shaft causes the rotor to be rotated in the heat generating chamber, so that the viscous fluid in the gap between the inner surface of the heat generating chamber and the outer surface of the rotor is subjected to shearing, thereby generating a heat. Then, a heat exchange of the heat of the viscous fluid with respect to the recirculating water occurs, thereby causing the recirculating water to be heated, which is fed to the heating system for heating the cabin of the vehicle.

In the viscous heater of the prior art, the inlet and outlet ports for the recirculating water are connected to the outside conduits for an engine cooling water by using unions formed as tubular portions extending integrally and in parallel from the housing. However, the arrangement of the outside conduits as combined with a cooling water recirculating system is different between types of vehicles in which the heater is mounted. Furthermore, an arrangement of unions for connecting the heater with the outside heating conduit is also different between the types of the vehicle to which the viscous heater is mounted. As a result, in the structure of the viscous heater, where the unions are integrated with the housing, different types of housings are required in accordance with the types of the vehicle, resulting in an increase in production cost.

SUMMARY OF THE INVENTION

An object of the present invention is to provide a viscous heater capable of overcoming the above mentioned difficulty.

Another object of the present invention is to provide a viscous heater allowing common use of the heater in different types of the vehicle.

According to the present invention, a heating system for a vehicle is provided having a water cooled internal combustion engine, wherein the heating system has conduits for connection with a water cooling system of the engine, said heating system comprising an auxiliary heating device having an inlet port for the engine cooling water and an outlet for the engine cooling water, and coupling means for providing coupling parts for connecting the inlet and the outlet ports with said conduits of the heating system, respectively at corresponding directing angles for allowing the coupling parts to be aligned with the respective conduits.

According to the present invention, the inlet and outlet ports in the auxiliary heater are connected with the corresponding conduits via the corresponding coupling parts having the corresponding directing angles conforming to the respective conduits. The unified construction of the viscous heater can be applicable to all of the kinds of cars by a mere replacement of the coupling unit, which is matched to a selected type vehicle. As a result, a reduction of a production cost is attained due to the reduced cost for a mold and a simplification of a production line.

Preferably, said auxiliary heater comprises side plates which are axially contacted so that a heat generating chamber is formed between the side plates, a housing for storing therein with the side plate, so that a heat emission chamber is formed between the side plates and the housing, the inlet and the outlet ports being opened to the heat emission chamber for a recirculation of the engine cooling water, a drive shaft which is rotatably supported by the housing, and a rotor connected to the drive shaft and arranged in the heat generating chamber, a gap being formed between an inner surface of the heat generating chamber and an outer surface of the rotor, a viscous fluid being filled in said gap. In the above structure, the viscous heater is simplified due to a simplified shape of the heat generating chamber as well as rotor, which is desirable in view of the fact that the viscous heater should be easily mounted to a vehicle.

Preferably, said coupling means comprises coupling pipes fitted to the inlet and outlet ports respectively, a separate flange plate which is together with the coupling pipes fixedly connected to said housing of the auxiliary heater. In this structure, a mere loosening of the flange member allows an angular position of the coupling pipes to be adjusted by rotating the coupling pipes.

Advantageously, said coupling means comprises coupling pipes fitted to the inlet and outlet ports, respectively, a flange member to which the coupling pipes are integrated, the flange member being fixedly connected to said housing of the auxiliary heater. By this construction, an integrated structure of the coupling is obtained, which is advantageous in that a reduction in the number of operations related to sealing is obtained.

Advantageously, said coupling means comprise coupling pipes which are separate from each other and which are directly fixed to the inlet and outlet ports, respectively. This structure is advantageous in the reduced number of parts.

Advantageously, the coupling part is formed with means for obtaining an angular adjustment of the coupling pipe with respect to the corresponding port. As a result, an angular adjustment can be very easily done without using any special tool.

BRIEF EXPLANATION OF ATTACHED DRAWINGS

DESCRIPTION OF PREFERRED EMBODIMENTS

Now, an embodiment of the present invention will be explained with reference to the attached drawings.

Figure 9:
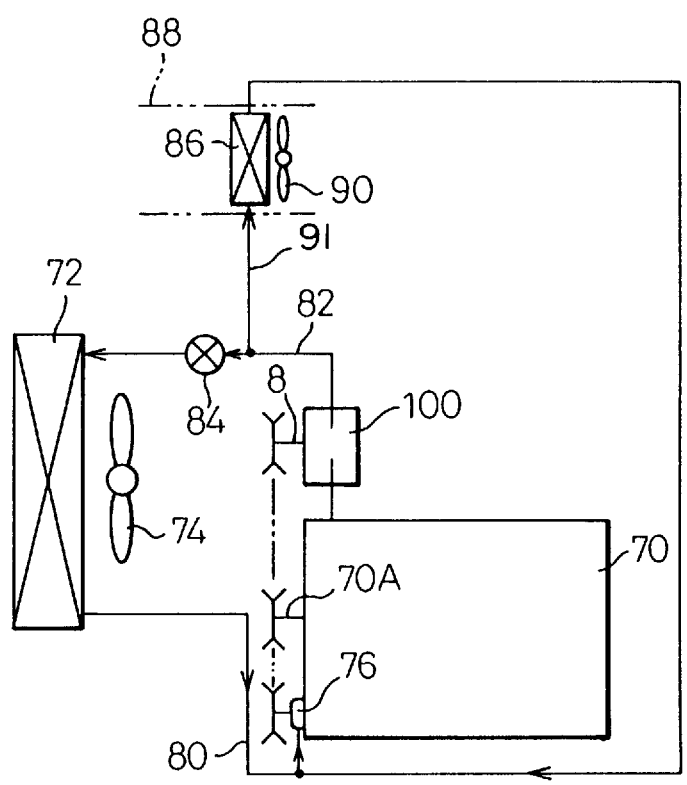
FIG. 9 is a schematic view of a heating system for a vehicle using a viscous heater according to present invention.

In FIG. 9, an internal combustion engine 70 is of a water cooled type having a radiator 72, a fan 74 faced with the radiator 72 and a water pump 76, which is driven by a crankshaft 70A of the engine via a pulley-belt transmission mechanism. The radiator 72 is, at its bottom end, formed with a water outlet connected to a conduit 80, which is connected to the water pump 76, so that the engine cooling water from the radiator 72 is introduced into a water jacket (not shown) of the engine. The radiator 72 has at its top a water inlet for receiving water from the water jacket in the engine block via a conduit 82. In the conduit 82, a thermostat valve 91 is arranged. From the conduit 82, a conduit 84 is branched, which is connected to a heater core 86, which is arranged in an air duct 88 opened to a cabin, so that an air flow heated by the heater core 86 is discharged under the action of a fan 90. A viscous heater 100 as an auxiliary heater is arranged in the engine cooling water conduit 82.

Figure 1:
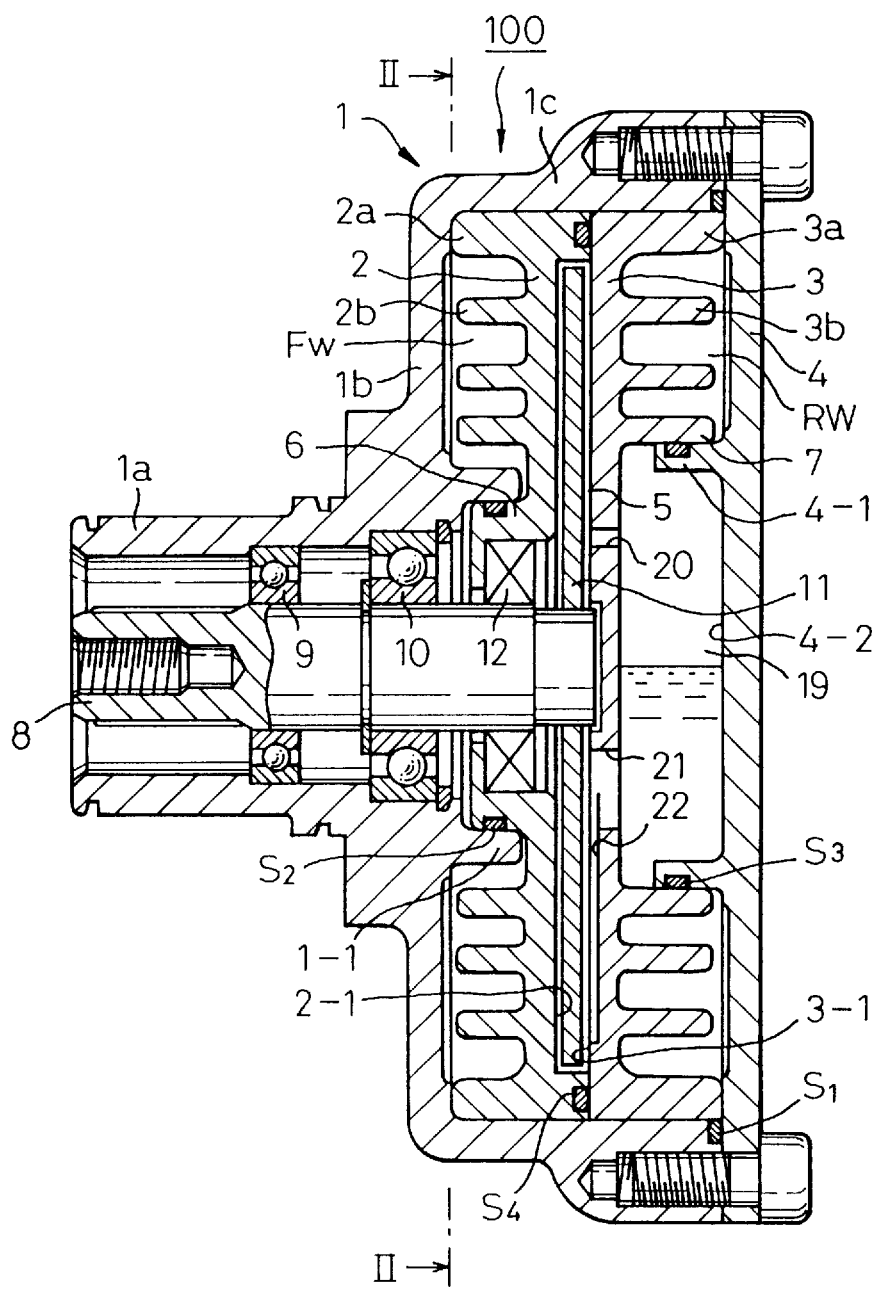
FIG. 1 is a longitudinal cross sectional view of a viscous heater according to the present invention.
Figure 2:
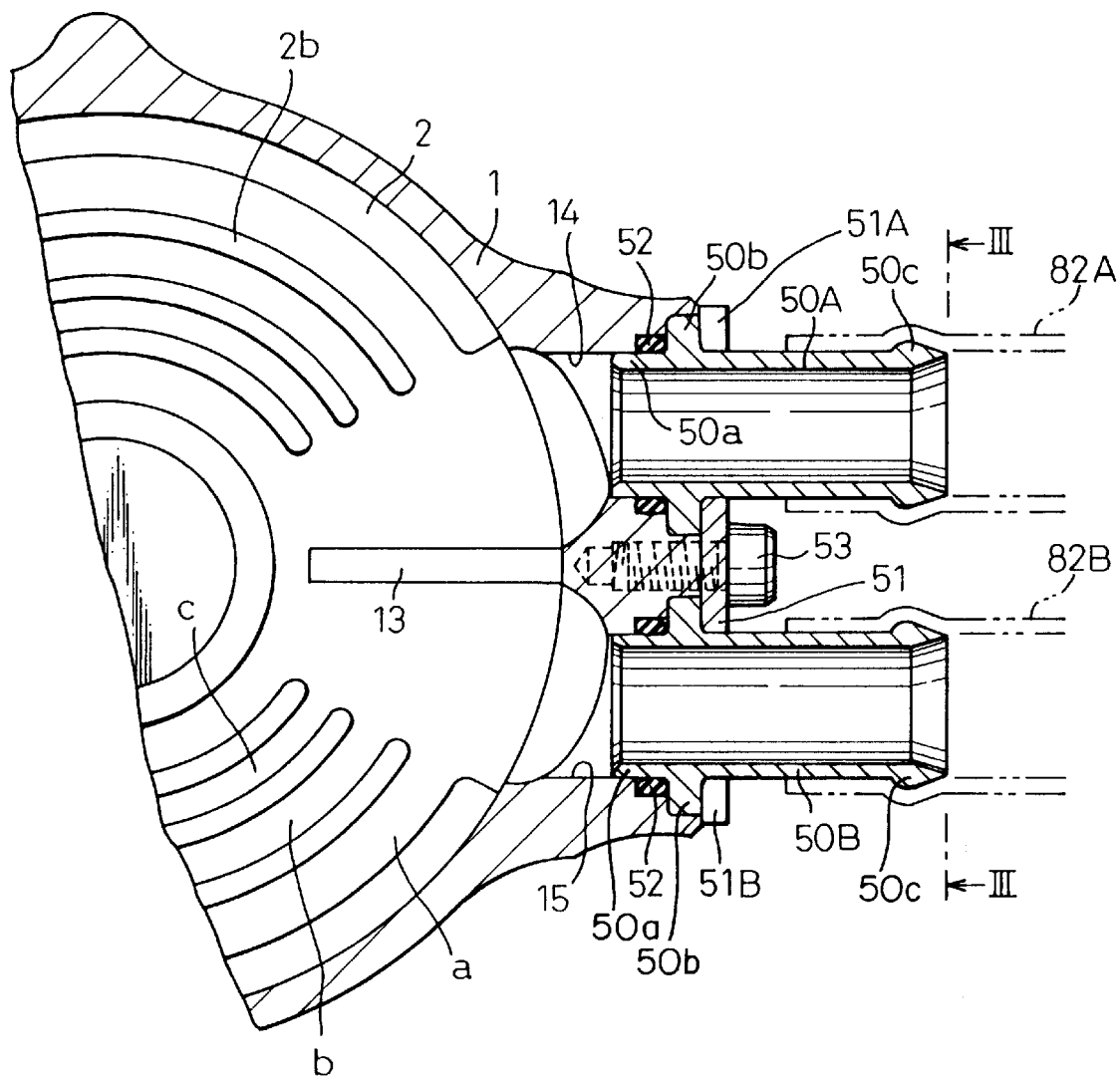
FIG. 2 is a transverse cross sectional view taken along line II—II in FIG. 1 and illustrating a coupling in the first embodiment of the present invention.
Figure 3:
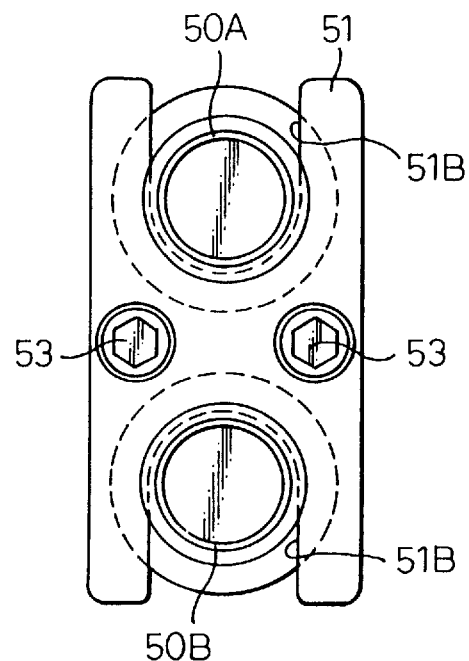
FIG. 3 is a view taken along a line III—III in FIG. 2.

FIGS. 1 to 3 show details of the viscous heater 100 in FIG. 9. A reference numeral 1 denotes a front housing, which is formed with a boss portion 1a, on which a transmission device, such as a clutch (not shown) is arranged, a disk portion 1b at the end of the boss portion 1a and a tubular portion 1c extending axially from an outer peripheral part of the disk portion 1b. Arranged inside the tubular portion 1c of the front housing 1 are front and rear side plates 2 and 3. A rear housing 4 in a plate shape is connected to an axial end of the tubular portion 1c of the front housing 1, so that a closed structure of the front and the rear side plates 2 and 3 in the housing is obtained.

The side plates 2 and 3, which are enclosed in the housings 1 and 4, are formed with rims 2a and 3a which are fitted inwardly of the cylindrical part 1c of the front housing 1, while the side plates 2 and 3 are axially held between the faced surfaces of the housings 1 and 4. The front side plate 2 is, at its rear side surface faced with the rear side plate 3, the side plate 2 is formed with a recess 2-1, which cooperates with the flat faced front surface 3-1 of the rear side plate 3, so that a heat generating chamber 5 is formed between the front and rear side plates 2 and 3. The side plates 2 and 3 are, at their central parts, formed with axially extending fitting parts 6 and 7, respectively. On the other hand, the front and rear housings 1 and 4 are formed with inner boss portions 1-1 and 4-1, respectively, which are fitted to the fitting parts 6 and 7, respectively. As a result, around the fitting part 6, an annular space adjacent the heat generating chamber 5, as a front water jacket (front heat emission chamber) FW, is formed between the front housing 1 and the front side plate 2. Furthermore, around the fitting part 7, an annular space adjacent the heat generating chamber 5, as a rear water jacket (rear heat emission chamber) RW, is formed between the rear housing 4 and the rear side plate 3.

A seal ring S1 is arranged between faced end surfaces of the front and the rear housings 1 and 4 so that the front and rear heat emission chambers FW and RW are sealed radially outwardly. Furthermore, between faced cylindrical surfaces of the fitting parts 1-1 and 6, a seal ring S2 is arranged. Furthermore, between faced cylindrical surfaces of the fitting parts 4-1 and 7, a seal ring S3 is arranged. As a result, a slight relative axial movement is allowed at the fitting parts, while the front and rear heat emission chambers FW and RW are sealed radially inwardly.

Axially spaced radial bearing units 9 and 10 are inserted to the boss portion 1a of the front housing 1, while a drive shaft 8 is inserted to the bearing units 9 and 10. As a result, the drive shaft 8 is rotatably supported by the housing 1. A rotor 11 is fixed on the drive shaft 8 and is arranged in the heat generating chamber 5 in such a manner that the rotor 11 is rotated in the heat generating chamber 5. A shaft seal unit (oil seal) 12 is arranged inward of the fitting part 6 at a location on the drive shaft 8 adjacent the front heat emission chamber FW.

As shown in FIGS. 1 and 2, the inner walls of the side plates 2 and 3 forming the heat emission chambers FW and RW are formed with radially spaced concentric fins 2b and 3b, respectively. As shown in FIG. 1, the fins 2b and 3b extend axially toward faced inner surfaces of the housings 1 and 4 forming the heat emission chambers FW and RW, so that a small axial gap is created between the fins 2b and 3b and the housings 1 and 4, respectively. As shown in FIG. 2, the front side plate 2 is formed with a partition wall 13 extending in a diametric direction in the front heat emission chamber FW, so that the chamber FW is divided in a first part opened to an inlet port 14 in the front housing 1 for an introduction of the recirculating water and a second part opened to an outlet port 15 in the housing 1 for a removal of the heating water from the viscous heater. The radially spaced concentric ribs 2b divide the front chamber FW so that radially spaced passageways a to c are created which extend circumferentially from the inlet port 14 to the outlet port 15. The width of the passageways is such that the width of the outer passageway is larger than that of the inner passageway, i.e., a>b>c, which allows the flow speed to be equalized between the passageways a to c. As to the ribs 3b of the rear side plate 3, the construction is the same. Namely, the ribs 3b divide the rear chamber RW so that radially spaced passageways, extending circumferentially from the inlet port 14 to the outlet port 15, are created.

As shown in FIG. 1, O-ring S4 is arranged between the faced end surfaces of the front and the rear side plates 2 and 3, so that a silicone oil as a viscous fluid can be introduced into the heat generating chamber 5 and the viscous fluid is filled in the gap between the inner surface of the heat generating chamber 5 and an outer surface of the rotor 11. Inward of the boss portion 4-1 of the rear housing 4, a recess 4-2, which cooperates with the faced surface of the side plate 3, forms a storage chamber 19 for reserving the viscous fluid. The rear side plate 3 is formed with a recovery passageway 20 for connecting the heat generating chamber 5 with the upper part of the storage chamber 19. The rear side plate 3 is formed with a feed passageway constructed by a feed hole 21 opened to the lower part of the storage chamber 19 and a feed groove 22 on the surface of the plate 3 adjacent the heat generating chamber, so that the viscous fluid reserved at the storage chamber 19 is fed to the heat generating chamber 5.

In the viscous heater in the illustrated embodiment directed to a use for a heating system of a vehicle, the drive shaft 8 is connected to a crankshaft of an internal combustion engine via a transmission mechanism including a pulley-belt system and a clutch, so that a rotating movement of the crankshaft 70A (FIG. 9) is transmitted to the drive shaft 8. The rotating movement of the shaft 8 causes the rotor 11 to be rotated in the heat generating chamber 5, so that the silicone oil is subjected to shearing in the gap between the inner surface of the heat generating chamber 5 and the outer surface of the rotor 11, thereby generating heat. The heat generated in the viscous heater is subjected to heat exchange with the recirculated water, in the water jackets FW and RW, which is fed to the outside heating device (heater core 86 in FIG. 9) for heating the cabin of the vehicle.

Figure 5:
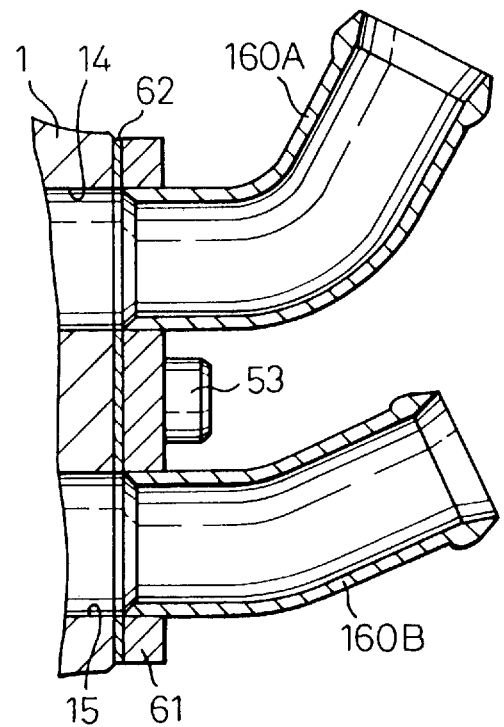
FIGS. 5 and 6 are similar to FIG. 4 but illustrate different embodiments of the present invention.
Figure 6:
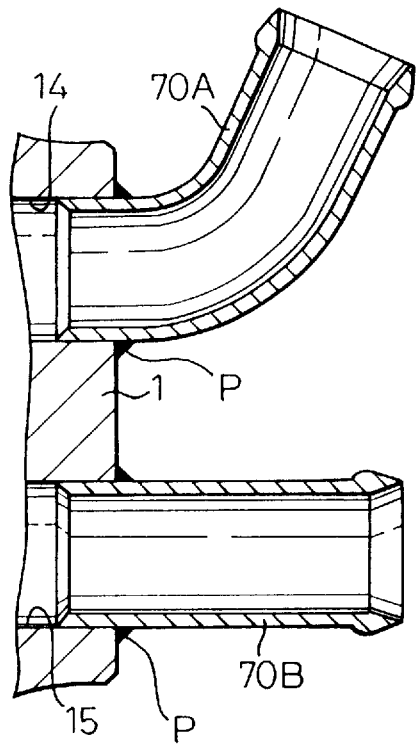

As explained above, the outside heating system as combined with the engine cooling water recirculating system is connected to the viscous heater. The essential part of the present invention is in a provision of an independent coupling assembly for connecting the inlet and the outlet ports 14 and 15 with the outside conduits. According to the present invention, the coupling assembly is, as shown in FIG. 2, constructed by coupling pipes 50A and 50B and a separate flange member (plate) 51. Each of the coupling pipes 50A and 50B is constructed as a tubular fitting part 50a fitted to the inlet port 14 or outlet port 15, a flange part 50b, which is fitted to a countersunk portion formed at an outer edge of the inlet port 14 or outlet port 15 and a neck portion 50c at the end of the tubular part 50a remote from the flange portion 50b. Outside conduits 82A and 82B for the recirculated engine cooling water are connected to the coupling pipes 50A and 50B as shown by phantom lines in FIG. 2. The flange part 51 is for fixedly connecting both of the coupling members 50A and 50B to the housing, while the flange portions 50b are located in the countersunk portions of the ports 14 and 15, respectively. As shown in FIG. 3, the flange part 51 is formed with U-shaped openings 51B opened outwardly, which makes it easy for the coupling pipes 50A and 50B to be introduced into the opening 51B of the flange plate 51. O-rings 52 are arranged between inner cylindrical surface of the ports 14 and 15 and the outer cylindrical surfaces of the pipes 50A and 50B, respectively. A reference numeral 53 denotes a bolt for fixing the flange plate 51 to the housing 1 while the pipes 50A and 50B are held between the plate 51 and the housing 1. In the arrangement in FIG. 2, the coupling pipes 50A and 50B are formed as a straight pipe. In other words, the pipes 50A and 50B are directed to connecting portions of the outside heating conduits 82A and 82B at an angle of zero degrees. The coupling pipes 50A and 50B can be directed to the outside conduits for the engine cooling water at an inclined angle (directing angle) as shown in FIGS. 5 or 6. The directing angle of the coupling pipes 50A and 50B is determined so that it conforms to a particular arrangement of the heating system (conduit) which varies between types of vehicles, while using a unified structure of the front housing 1, which, for the viscous heater, functions as a shell structure provided with fitting portions for connection with the coupling members. Furthermore, the provision of the coupling pipes 50A and 50B allows the shell structure to be very easily connected to the outside conduit for the engine cooling water. Furthermore, according to this embodiment, both of the coupling pipes 50A and 50B are fixed to the housing by using the same flange plate 51. As a result, an advantage is obtained in that an adjustment of an angular position of the coupling pipes 50A and 50B can be easily done by simply loosening the bolt.

Figure 4:
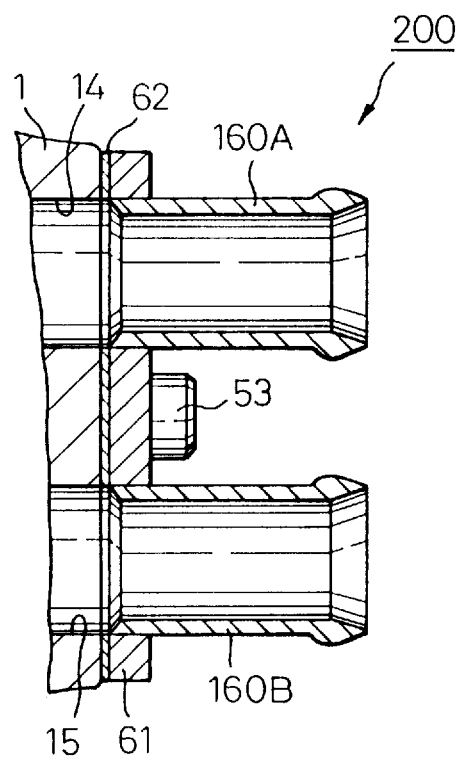
FIG. 4 is a partial view of a coupling in a second embodiment.

FIGS. 4 and 5 show a second embodiment of the present invention, where an inlet coupling pipe 160A and an outlet coupling pipe 160B are provided for the inlet port 14 and the outlet port 15, respectively. Unlike the coupling pipes 50A and 50B provided with flanged end portions 50b in the first embodiment, the coupling pipes 160A and 160B have straight end portions which are press fitted or welded to corresponding openings in a flange plate 61, so that an integrated flange assembly 200 is created. The plate 61 is connected, by bolts 53, to the housing 1 via a gasket 62, so that the coupling pipes 160A and 160B are in communication with the ports 14 and 15, respectively. In the similar way a in the first embodiment, the coupling pipes 160A and 160 have respective directing angles which allow the pipes 160A and 160B to be connected to the respective connecting portions of the outside heating conduits specifically, in FIG. 4, both of the pipes 160A and 160B are constructed as straight tubes, i.e., the directing angle is zero degree. As shown in FIG. 5, the pipes 160A and 160B are curved tubes of different values of the directing angle. However, a desired combination of the coupling pipes of desired values of directing angles can be employed.

In the second embodiment as shown in FIGS. 4 and 5, the coupling pipes 160A and 160B together with the flange plate 61 are integrated into the assembly 200, which makes, in a production line, the administration of parts easy, and reduces the number of working steps related to sealing.

FIG. 6 shows a third embodiment of the present invention, which features coupling pipes 70A and 70B of different values of the directing angle and in which the coupling pipes 70A and 70B are directly connected to the inlet and outlet ports 14 and 15 by a press fitting or welding P. This embodiment is advantageous in that the construction is simplified due to the small number of parts.

Figure 7:
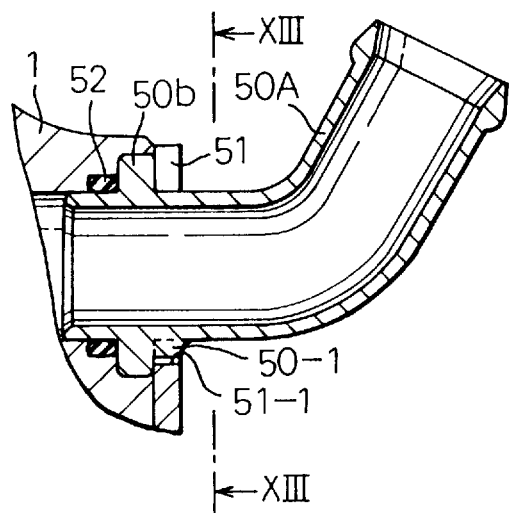
FIG. 7 is a partial view of a coupling in further another embodiment of the present invention taken along a line XII—XII in FIG. 8.
Figure 8:
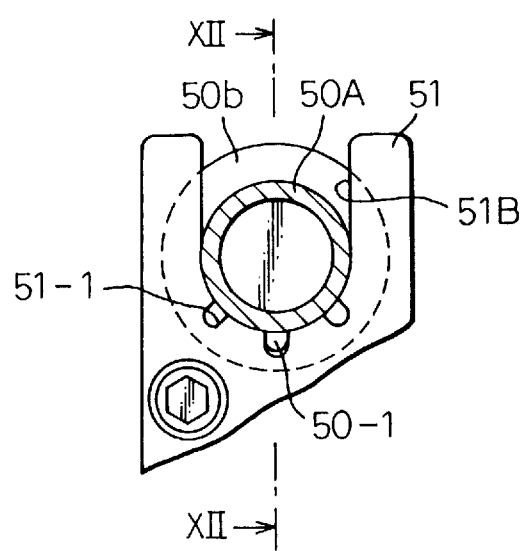
FIG. 8 is a cross sectional view taken along a line XIII—XIII in FIG. 7.

In an embodiment in FIGS. 7 and 8, which is a slight modification of the first and second embodiments, the coupling pipe 50A is, on its outer cylindrical wall and at a predetermined location along its circumference, formed with a radial projection 50-1, while the U-shaped opening 51B is, at its inner circular surface, a circumferentially spaced recess 51-1 at a respective predetermined angular position. Thus, an installation o the coupling pipe 50A to the opening 51B causes the projected portion 50-1 to be easily fitted to one of the desired recess 51-1, which allows the coupling member 50A to be arranged on the housing at the desired angular position, without necessitating a complex operation and without requiring any special tool for the adjustment.

We claim:

1. A heating system for a vehicle having a water cooled internal combustion engine, wherein said heating system comprises liquid conduits for connection with a water cooling system of the engine, comprising:

an auxiliary heating device which includes a housing assembly containing a heat generating means therein and having an inlet port for introduction of the engine cooling water and an outlet port for delivery of the engine cooling water from said heating device, said inlet and outlet ports being formed in said housing assembly;

coupling pipes formed to be separate from said housing assembly and assembled with said housing assembly for connecting said inlet and outlet ports with said liquid conduits, respectively, at corresponding directing angles for allowing outer coupling portions of said coupling pipes to be in registration with said respective conduits, and fixing means for fixing said coupling pipes to said housing assembly at positions to allow inner coupling portions thereof to be in alignment with said inlet and outlet ports.

2. A heating system according to claim 1, wherein said auxiliary heating device comprises:

side plates which are axially combined together so that a heat generating chamber is formed between the side plates, the side plates being housed in said housing assembly so that a heat emission chamber is formed between the side plates and the housing assembly, the inlet and the outlet ports of the housing assembly being opened to the heat emission chamber for recirculation of the engine cooling water;

a drive shaft rotatably supported by the housing assembly; and a rotor connected to the drive shaft and arranged in the heat generating chamber, wherein an inner surface of said heat generating chamber and an outer surface of said rotor define a heat generating gap filled with a viscous liquid.

3. A heating system according to claim 1, wherein said fixing means comprises: a separate flange plate which is, together with said coupling pipes, fixedly attached to said housing assembly of said auxiliary heating device so as to fix said coupling pipes to said housing assembly.

4. A heating system according to claim 3, wherein each of said coupling pipes has a fitting portion to be positioned in the inlet or outlet port and a flange portion formed integrally with said coupling pipe, the flange portion being located between a countersunk portion of the inlet or outlet port and said separate flange plate.

5. A heating system according to claim 3, wherein said flange plate has openings for said coupling pipes to be inserted therein, said openings being formed as U-shaped openings.

6. A heating system according to claim 1, wherein said fixing means comprises a flange plate to which said coupling pipes are integrated, said flange plate being fixedly connected to said housing assembly of the auxiliary heating device.

7. A heating system according to claim 1, wherein said coupling pipes are separate with each other, and are directly fixed to the inlet and outlet ports of said housing assembly, respectively.

8. A heating system according to claim 1, wherein said coupling pipes are fitted to the inlet and outlet ports, respectively, and means for obtaining an angular adjustment of the coupling pipes with respect to the corresponding ports.

9. A heating system according to claim 8, wherein said means for obtaining angular adjustment comprises a radial projection formed in an outer circumference of said coupling pipes and situated in one of angularly spaced complementary recesses formed in said fixing means.

* * * * *